(12) United States Patent
Salaverry

(10) Patent No.: US 8,662,854 B1
(45) Date of Patent: Mar. 4, 2014

(54) TURBINE WITH TURBULENCE INDUCING SURFACE

(75) Inventor: Peter C. Salaverry, Dallas, TX (US)

(73) Assignee: Fastskinz, Inc., Dallas, TX (US)

( * ) Notice: Subject to any disclaimer, the term of this patent is extended or adjusted under 35 U.S.C. 154(b) by 583 days.

(21) Appl. No.: 12/892,747

(22) Filed: Sep. 28, 2010

Related U.S. Application Data

(60) Provisional application No. 61/347,298, filed on May 21, 2010.

(51) Int. Cl.
*F03D 1/06* (2006.01)

(52) U.S. Cl.
USPC .......... 416/228; 415/907; 415/914; 416/241 R

(58) Field of Classification Search
USPC .......... 29/889.7, 889.71; 290/44, 55; 415/907, 415/908, 914; 416/227 R, 228, 229 R, 231 R, 416/241 A, 241 R
See application file for complete search history.

(56) References Cited

U.S. PATENT DOCUMENTS

| | | | |
|---|---|---|---|
| 3,604,661 A | 9/1971 | Mayer, Jr. | 244/42 |
| 3,779,199 A | 12/1973 | Mayer, Jr. | 115/14 |
| 4,183,506 A | 1/1980 | Teshima et al. | 266/88 |
| 4,256,304 A | 3/1981 | Smith et al. | 273/60 B |
| 4,284,302 A | 8/1981 | Drews | 296/1 S |
| 4,313,635 A | 2/1982 | Front | |
| 4,340,822 A * | 7/1982 | Gregg | 290/55 |
| 4,343,506 A | 8/1982 | Saltzman | |
| 4,455,045 A | 6/1984 | Wheeler | 296/1 S |
| 4,729,716 A | 3/1988 | Schmidt | 416/10 |
| 4,736,912 A | 4/1988 | Loebert | 244/130 |
| 4,883,556 A | 11/1989 | Leavitt, Sr. et al. | 156/273.3 |
| 4,932,716 A | 6/1990 | Marlowe et al. | |
| 4,940,622 A | 7/1990 | Leavitt, Sr. et al. | 428/137 |
| 4,955,709 A | 9/1990 | Smith | 351/46 |
| 5,000,508 A | 3/1991 | Woods | 296/180.5 |
| 5,058,837 A * | 10/1991 | Wheeler | 244/200.1 |
| 5,133,516 A | 7/1992 | Marentic et al. | 244/130 |
| 5,289,997 A | 3/1994 | Harris | 244/130 |
| D348,705 S | 7/1994 | Onopa | |
| 5,407,245 A | 4/1995 | Geropp | 296/180.1 |

(Continued)

OTHER PUBLICATIONS

Salaverry, Notice of Allowance, U.S. Appl. No. 12/102,668, Aug. 27, 2010, 7 pgs.

(Continued)

*Primary Examiner* — Edward Look
*Assistant Examiner* — Liam McDowell
(74) *Attorney, Agent, or Firm* — Morgan, Lewis & Bockius LLP

(57) ABSTRACT

The disclosed embodiments relate to turbulence inducing mechanisms applied to portions of wind turbine blades and methods for increased power production using turbulence inducing mechanisms. Embodiments provide methods and mechanisms for increasing the range of optimal wind performance for wind turbines and provide for increasing the maximum energy producing capacity of wind turbines at a given wind speed. Some embodiments have a rotor blade that includes a capture side and a drag side. The blade also includes a film disposed over at least a portion of only the drag side of the blade. The film comprises a conformable sheet material with a plurality of perforations therethrough which are configured to induce turbulence on a fluid flowing thereover. The turbulence inducing film reduces the drag of the blade and consequently increases the blade's rotational speed at a given wind speed, which increases the turbine's power production and optimal performance range.

14 Claims, 14 Drawing Sheets

(56) References Cited

U.S. PATENT DOCUMENTS

| | | | |
|---|---|---|---|
| 5,734,990 A | 4/1998 | Waring | 2/69 |
| 5,773,110 A | 6/1998 | Shields | 428/40.1 |
| 5,803,409 A | 9/1998 | Keefe | 244/206 |
| D406,552 S | 3/1999 | Hellhake et al. | |
| 5,925,437 A | 7/1999 | Nelson | 428/137 |
| D429,199 S | 8/2000 | Bulaquena et al. | |
| D437,258 S | 2/2001 | Meryman et al. | |
| D441,539 S | 5/2001 | Streit | D5/3 |
| D460,023 S | 7/2002 | Beigel | |
| 6,551,029 B2 | 4/2003 | Shu et al. | 405/211 |
| 6,644,894 B2 | 11/2003 | Shu et al. | 405/211 |
| 6,666,646 B1 | 12/2003 | Van Ierland et al. | 415/177 |
| 6,732,972 B2 | 5/2004 | Malvestuto, Jr. | 244/12.3 |
| D496,620 S | 9/2004 | Perfetti et al. | |
| 6,849,007 B2 | 2/2005 | Morgan et al. | 473/378 |
| 7,028,478 B2* | 4/2006 | Prentice, III | 60/645 |
| 7,070,850 B2 | 7/2006 | Dietz et al. | 428/172 |
| D539,704 S | 4/2007 | Angelo et al. | |
| 7,278,930 B2 | 10/2007 | Yokota et al. | 473/378 |
| D566,009 S | 4/2008 | Beigel et al. | |
| D593,907 S | 6/2009 | Piedy | |
| 7,594,867 B2 | 9/2009 | Nardacci | 473/383 |
| 7,604,461 B2 | 10/2009 | Bonnet | 416/235 |
| 7,644,977 B2 | 1/2010 | Drews | 296/181.5 |
| D632,224 S | 2/2011 | Peltola et al. | |
| D666,541 S | 9/2012 | Stimel, Jr. | |
| 2003/0019737 A1 | 1/2003 | Matsumoto et al. | |
| 2003/0021030 A1 | 1/2003 | Smith | |
| 2004/0137252 A1 | 7/2004 | Bonnet et al. | 428/500 |
| 2004/0224126 A1 | 11/2004 | Aeling et al. | |
| 2005/0107189 A1 | 5/2005 | Ohama et al. | 473/371 |
| 2006/0103167 A1 | 5/2006 | Wong et al. | |
| 2007/0110585 A1* | 5/2007 | Bonnet | 416/235 |
| 2007/0284848 A1 | 12/2007 | Brownlie | 280/288.1 |
| 2008/0080977 A1* | 4/2008 | Bonnet | 416/229 A |
| 2008/0240923 A1* | 10/2008 | Bonnet | 416/223 R |
| 2008/0268258 A1 | 10/2008 | Verma et al. | 428/421 |
| 2008/0272241 A1 | 11/2008 | Brulhart | 244/200.1 |
| 2008/0286110 A1* | 11/2008 | Gupta et al. | 416/241 A |
| 2008/0303309 A1 | 12/2008 | Dayton | |
| 2009/0074585 A1* | 3/2009 | Koegler et al. | 416/228 |
| 2009/0209367 A1 | 8/2009 | Stefan et al. | 473/373 |
| 2009/0256385 A1 | 10/2009 | Salaverry | 296/180.1 |
| 2010/0117396 A1 | 5/2010 | Dayton | |
| 2010/0181434 A1 | 7/2010 | Powell et al. | |
| 2010/0264654 A1* | 10/2010 | Prasad | 290/50 |
| 2011/0089716 A1 | 4/2011 | Hall | |
| 2011/0272964 A1 | 11/2011 | Henderson et al. | |
| 2012/0244412 A1 | 9/2012 | Pascaly et al. | |
| 2012/0261945 A1 | 10/2012 | Litchfield | |

OTHER PUBLICATIONS

Salaverry, Notice of Allowance, U.S. Appl. No. 12/877,932, Dec. 21, 2011, 8 pgs.

Salaverry, Notice of Allowance, U.S. Appl. No. 29/404,017, Nov. 28, 2012, 10 pgs.

Avery Dennison Corporation, DOL 1000 Gloss Clear Cast Vinyl, Product Data Bulletin, Nov. 7, 2005, 2 pages.

Avery Dennison Corporation, DOL 4500 Conformable Perforated Window Film Overlaminate, Product Data Bulletin, Mar. 28, 2007, 2 pages.

Avery Dennison Corporation, MPI 1007 EZ Cast Vinyl Film for Digital, Product Data Bulletin, Nov. 2, 2007, 2 pages.

Avery Graphics, Perforated Window Film, Product Data Bulletin, Mar. 26, 2002, 2 pages.

Bushnell et al., Viscous Drag Reduction in Boundary Layers, 1990, American Institute of Aeronautics and Astronautics, Inc., Washington DC, 265 pages. (Part 1 of 2).

Bushnell et al., Viscous Drag Reduction in Boundary Layers, 1990, American Institute of Aeronautics and Astronautics, Inc., Washington DC, 260 pages. (Part 2 of 2).

Clairborne, Q&A, The New York Times, Jan. 7, 2003, 1 page.

Customize Your Car-Without Paint, www.importtuner.com/reviews/parts/0408_impp_power_gear/skinz_wraps.html, downloaded May 6, 2010, pp. 1.

Dale; How NASA Helped Olympic Swimmers in Beijing; Aug. 22, 2008; http://blogs.nasa.gov/cm/blog/Shana%27s-Blog/posts/post_1219426302896.html; 3 pages.

Delozier, Fastskinz Vehicle Wraps May Not Be an Easy Solution to Increased Miles per Gallon, inventorspot.com/articles/fastskinz_vehicle_wraps_may_not_be_easy_solution_increa . . . , downloaded May 6, 2010, pp. 1-4.

Fast Skinz Executive Summary, 2008, pp. 1-8.

Holusha; Business Technology Advances: 3M Coating Aids Yacht in Cup Effort; Feb. 4, 1987; The New York Times; New York, NY; http://www.nytimes.com/1987/02/04/business/business-technology-advances-3m-coating-aids-yacht-in-cup-effort.html; 1 page.

How Wind Turbines Work, Wind and Water Power Program: How Wind Turbines Work, Nov. 30, 2006, www1.eere.energy.gov/windandhydro/printable_versions/wind_how.html, downloaded May 3, 2010, pp. 1-4.

Layton, How Wind Power Works, Howstuffworks "How Wind Power Works", science.howstuffworks.com/wind-power/htm/printable, downloaded May 3, 2010, pp. 1-9.

Nike, Nike Designs Exclusive Highly Aerodynamic Swift Spin Body Suite for His 2002 Tour de France U.S. Postal Service Team, Jul. 8, 2002, 3 pages.

Physlink.com, Why do Dimples on a Golf Ball Allow it to Travel Farther?, Apr. 4, 2008, 2 pages.

Popular Science, New Speed Skating Suit, 2007, 2 pages.

Riedy; All About the Bike; Jul. 2, 2003; http://www.popsci.com/scitech/article/2003-07/all-about-bike; 2 pages.

Scientific American, How do Dimples in Golf Balls Affect their Flight?, Sep. 19, 2005, 1 page.

Skinsuits and Boundary Layers, What Do Skinsuits Have to Do With Boundary Layers?, Jul. 15, 2002, 10 pages.

Stewart, Fastskinz Test Drive: Can a Golf Ball Covering Improve MPGs?, Popularmechanics.com, 2010, popularmechanics.com/cars/news/4316702, downloaded May 6, 2010, pp. 1-3.

The (London) Independent, Sharkskin Swimsuits Lead Hi-Tech Bid for Olympic Gold, Mar. 17, 2000, 2 pages.

The Science and Theories Behind Drag Reducing Vehicle Wrap Material, Exclusively Distributed by SkinzWraps, Finds Support in Newest Episode of Discovery Channel's Mythbusters, Oct. 22, 2009, www.marketwire.com/mw/rel_us_print.jsp?id=1064119 &lang=E1, downloaded May 6, 2010, pp. 1.

VeloNews Journal of Competitive Cycling, Tour Tech-Its Gotta be the Suit, Jul. 25, 2003, 3 pages.

Voelcker, Today's Mileage Tip: Turn Your Car Into a Shark, www.greencarreports.com/blog/1018646_todays-mileage-tip-turn-your-car-into-a-shark, downloaded May 6, 2010, pp. 1-2.

Office Action, U.S. Appl. No. 12/102,668, Jan. 27, 2010, 7 pages.

Office Action, U.S. Appl. No. 29/306,684, Jun. 22, 2009, 5 pages.

Final Office Action, U.S. Appl. No. 29/306,684, Mar. 31, 2010, 7 pages.

Office Action, U.S. Appl. No. 12/877,932, Jan. 27, 2011, 7 pgs.

* cited by examiner

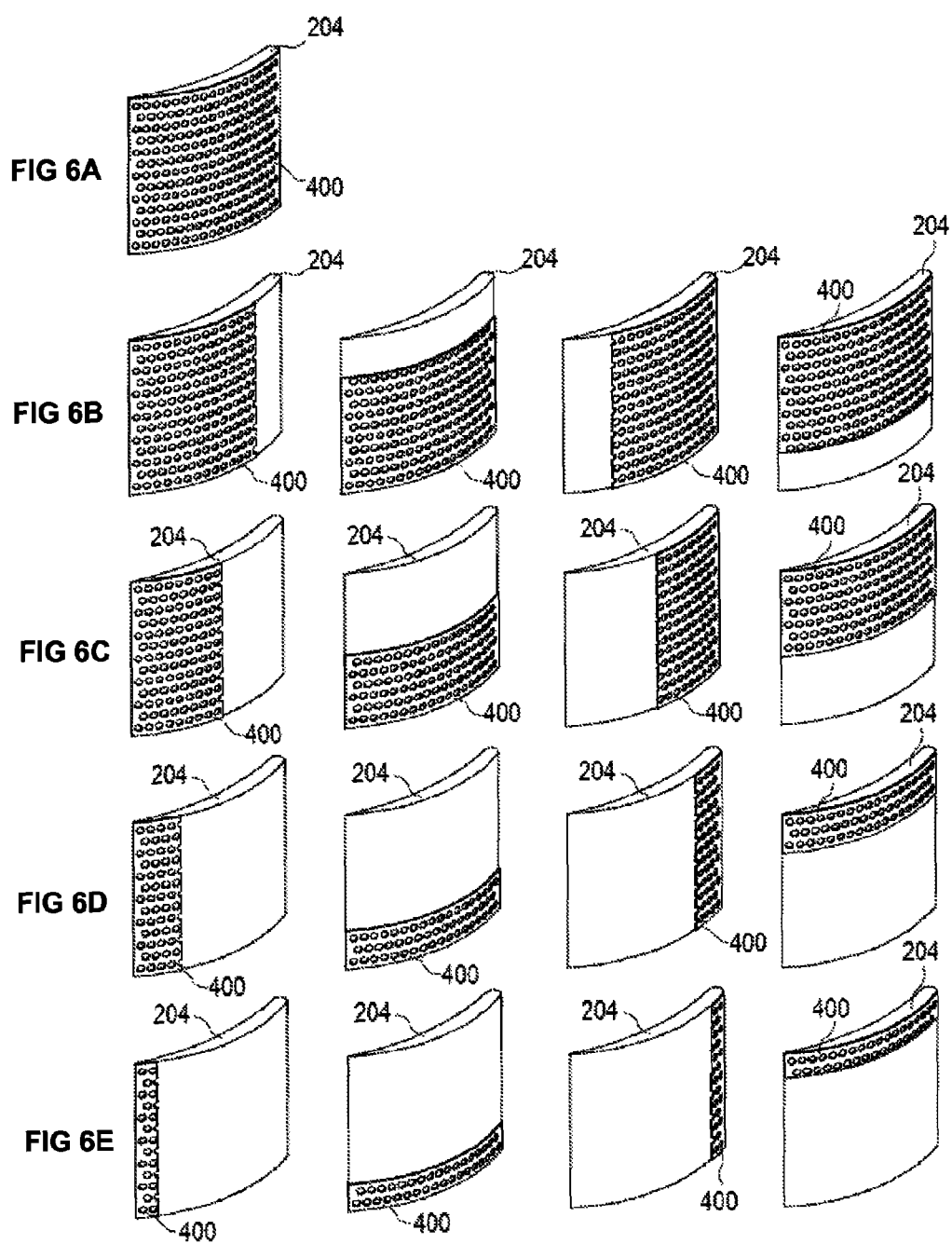

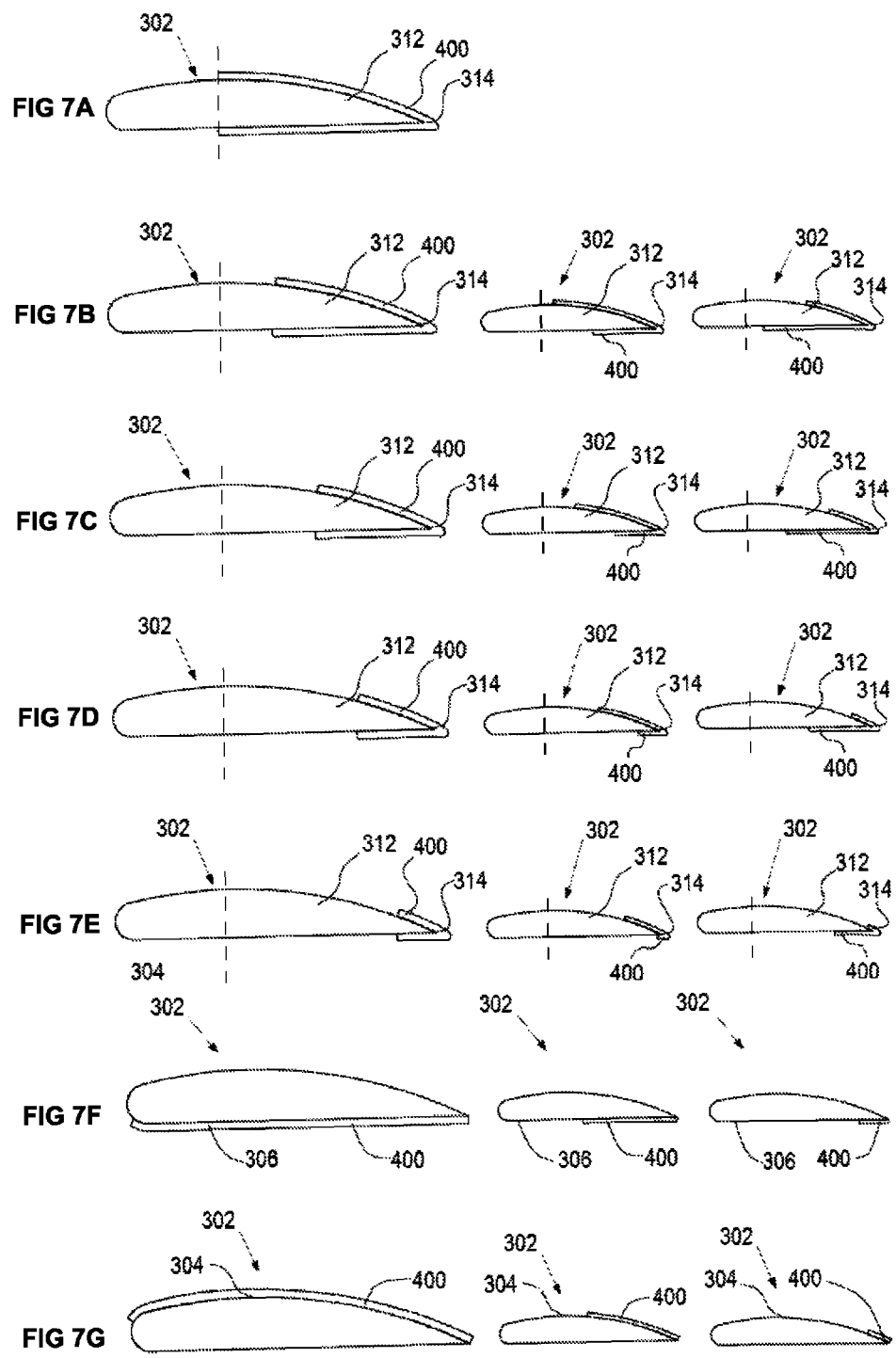

TURBINE WITH TURBULENCE INDUCING SURFACE

RELATED CASES

This application claims priority to U.S. Provisional Patent Application Ser. No. 61/347,298 filed May 21, 2010, which is incorporated herein by reference in its entirety.

TECHNICAL FIELD

The disclosed embodiments relate generally to wind turbines, turbulence inducing mechanisms applied to portions of wind turbine blades, and methods for increased power production of wind turbines using turbulence inducing mechanisms.

BACKGROUND

Increasingly, energy producers are looking for alternative and clean sources of energy. Fossil fuels have numerous drawbacks. There is a limited total amount of fossil fuel available. Sources of fossil fuels are often in volatile geographic locations which affects pricing and availability. Also, fuels produce pollution which has been linked to health issues and climate change. One way to address these problems is to use clean technologies, such as wind power.

Wind turbines can be used to generate power with no fuel cost. Wind energy is clean and renewable and does not produce any harmful gases like $CO_2$ and nitrogen oxides. Furthermore, wind turbines can be used in remote areas not served by the central power grid such as rural areas and developing countries.

However, current wind turbine technology has some disadvantages. Wind turbine farms generally require particular locations. So although some amount of wind exists nearly everywhere, current wind turbine technology does not make every location practical for wind turbine power production. Also, an average wind turbine only produces electricity for 35% of the day. This is partially due to the fact that current wind turbines require optimal wind speeds to be productive. Even small wind turbines may require winds of at least 9 miles per hour before they can be effectively run. Conversely, when winds are too strong, even large commercial wind turbines cannot be run. Many wind turbines are shut down when wind speeds exceed 45 miles per hour. Thus, using current wind turbine technology, wind farms are only practical in specific locations that have a steady supply of "optimal" winds. Some large turbines produce their maximum power at wind speeds around 33 miles per hour.

It would be advantageous to provide a mechanism and method for increasing the range of optimal wind performance for already existing wind turbines. For example, it would be advantageous to provide a mechanism and method for low speed wind turbines to be effective at even lower wind speeds. Similarly, it would be advantageous to provide a mechanism and method for high speed wind turbines to be effective at even higher wind speeds. If wind turbines were provided with mechanisms for running at lower or higher speeds, then they could run for more than 35% of the day, and thus be capable of producing more electric energy.

Also, it would be advantageous to provide a mechanism and method that allows new wind turbines to be built in places that have previously been deemed too inefficient for wind turbines. For example, if wind turbines were provided with a mechanism that increases their range of performance in high winds, then extremely windy areas previously deemed undesirable locations for wind farms, could be used. Similarly, if wind turbines were provided with a mechanism that increases their range of performance in low winds, then areas previously deemed not windy enough to be undesirable locations for wind farms could also be used.

It would also be advantageous to provide a mechanism and method for increasing the maximum energy producing capacity of a wind turbine. It would be advantageous to provide a mechanism and method for making wind turbines reach maximum energy producing capacity at lower wind speeds. For example, wind turbines that reach maximum power at wind speeds of 25 miles per hour, rather than 33 miles per hour, would produce maximum power a larger percentage of their operation time.

SUMMARY

The present invention overcomes the limitations and disadvantages described above by providing methods and mechanisms for increasing the range of optimal wind performance for already existing wind turbines as well as for new wind turbines. The present invention also provides methods and mechanisms for increasing the maximum energy producing capacity of a wind turbine at a given wind speed.

The following presents a summary of the invention in order to provide a basic understanding of some of the aspects of the invention. This summary is not an extensive overview of the invention. It is not intended to identify key/critical elements of the invention or to delineate the scope of the invention. Its sole purpose is to present some of the concepts of the invention in a simplified form as a prelude to the more detailed description that is presented later.

Some embodiments provide a rotor blade that includes a first side of the blade, a second of the blade opposing the first side of the blade, a first edge disposed between the first side of the blade and the second side of the blade and a second edge disposed between the first side of the blade and the second side of the blade opposing the first edge. The blade also includes a film disposed over at least a portion of the first side, the second side, the first edge, and/or the second edge. The film comprises a conformable sheet material with a plurality of perforations therethrough. The perforations are configured to induce turbulence on a fluid flowing thereover.

Some embodiments provide a turbine with a rotor comprising a hub and a plurality of blades. Each of the blades has a first side of the blade, a second side of the blade opposing the first side of the blade, a first edge disposed between the first side of the blade and the second side of the blade, and a second edge disposed between the first side of the blade and the second side of the blade opposing the first edge. The blade also includes a film disposed over at least a portion of the first side, the second side, the first edge, and/or the second edge. The film comprises a conformable sheet material with a plurality of perforations therethrough. The perforations are configured to induce turbulence on a fluid flowing thereover.

Some embodiments provide a method of generating electricity with a wind turbine. The method includes providing a wind turbine with a generator and a rotor. The rotor includes a plurality of blades. Each blade has a first side of the blade, a second side of the blade opposing the first side of the blade, a first edge disposed between the first side of the blade and the second side of the blade, and a second edge disposed between the first side of the blade and the second side of the blade opposing the first edge. The blade also includes a film disposed over at least a portion of the first side, the second side, the first edge, and/or the second edge. The film comprises a conformable sheet material with a plurality of perforations therethrough. The perforations are configured to induce turbulence on a fluid flowing thereover. The method also includes allowing wind to rotate the rotor, allowing the generator to generate electric power due to the rotor's rotation; and supplying the generated electric power to a power grid.

Some embodiments provide a method of inducing turbulence in a boundary layer associated with a fluid flowing over a turbine blade. The method includes providing a turbine blade. The turbine blade has a first side of the blade, a second side of the blade opposing the first side of the blade, a first edge disposed between the first side of the blade and the second side of the blade, and a second edge disposed between the first side of the blade and the second side of the blade opposing the first edge. The method further includes providing a film comprising a conformable sheet material with a plurality of perforations therethrough. The perforations are configured to induce turbulence on a fluid flowing thereover. The method also includes applying the film to at least a portion of the first side, the second side, the first edge, and/or the second edge.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

FIGS. 6A-6E are perspective views illustrating capture type blades with turbulence inducing film disposed thereover in accordance with some embodiments of the invention.

FIGS. 7A-7G are cross sectional views illustrating foil type blades with turbulence inducing film disposed thereover in accordance with some embodiments of the invention.

Like reference numerals refer to corresponding parts throughout the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, and components have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first side of a rotor blade could be termed a second side, and, similarly, a second side could be termed a first side, without departing from the scope of the present invention. The first side and the second side are both sides, but they are not the same side of the rotor blade.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," as well as the terms "includes" and/or "including" when used in this specification, specify the presence of stated features, steps, elements, and/or components, but do not preclude the presence or addition of one or more other features, steps, elements, components, and/or groups thereof. As used herein, the term "if" may be construed to mean "when" or "upon" or "in response to determining" or "in response to detecting," depending on the context.

Figure 1:
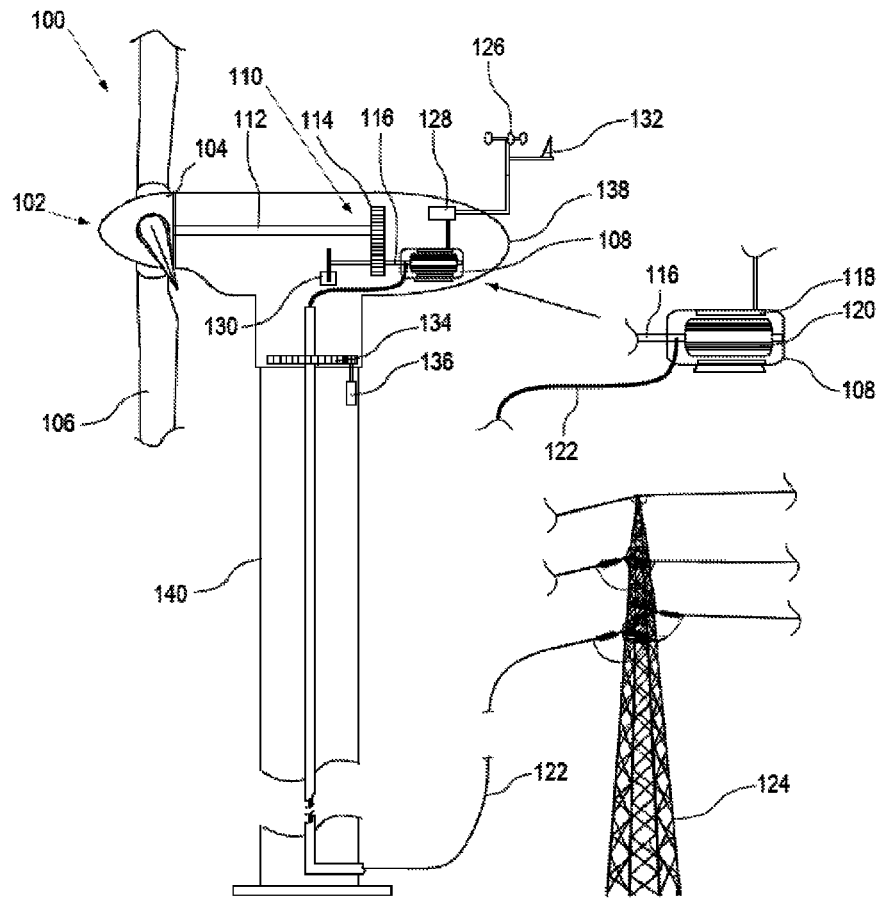
FIG. 1 is a planar view of a wind turbine in accordance with one embodiment of the invention.

FIG. 1 is an embodiment of a turbine, which is powered by wind. Wind is caused by the uneven heating of the atmosphere by the sun, irregularities of the earth's surface, and the rotation of the earth. Kinetic energy of wind can be captured by wind turbines and converted into mechanical, rotational energy (i.e., wind can be used to rotate the blades of a wind turbine.) The mechanical, rotational energy can be converted into electrical energy using a generator. As such, wind can be used to generate electricity with no fuel cost and does not produce harmful gases like $CO_2$ or nitrogen oxides.

FIG. 1 is an embodiment of a wind turbine 100 according to some embodiments of the invention. It should be noted that many turbines with rotor blades can employ the film described in this application. The details described with reference to FIG. 1 are for illustration purposes and should not be construed as the only embodiment of a rotor or turbine encompassed in this application. The wind turbine 100 includes a rotor 102 comprising a hub 104 and a blade 106. FIG. 1 shows an embodiment with three blades 106, while other embodiments will have two blades, four blades, or more. When wind rotates the blades 106 of the rotor 102 the mechanical energy of the rotor 102 is transferred to a generator 108. In the embodiment shown in FIG. 1, the rotor 102 is connected to the generator 108 through a gear mechanism 110 comprising a low speed shaft 112, connected to a gear box 114, connected to a high speed shaft 116 that drives the generator 108. In some embodiments, the low speed shaft 112 is configured to rotate at speeds from 30 to 60 rotations per minute. Similarly, in some embodiments the high speed shaft 116 is configured to rotate at about 1000 to 18000 rotations per minute. The generator 108 comprises at least one permanent magnet 118, or an assembly of multiple magnets 118 surrounding a conductor 120, such as a coiled wire. In the generator 108, the magnet(s) 118 rotated by the high speed shaft 116 generate voltage in the conductor 120, by means of electromagnetic induction. The voltage drives electrical current (typically alternating current, or AC power) through power lines 122 for distribution to a power grid 124.

The amount of power that a wind turbine 100 can generate depends on the design of the wind turbine 100. For example, longer turbine blades 106 have a greater electricity generating capacity than shorter blades 106. A general rule of thumb is that doubling the rotor 102 diameter produces a four-fold increase in energy output from a wind turbine 100. Furthermore, it should be noted that the power produced by a wind turbine is related to wind speed in a nonlinear fashion. In some embodiments the electrical power generated is related to the cube of the wind speed.

In some embodiments, additional components are used. As shown in FIG. 1, the wind turbine 100 includes an anemometer 126, for measuring the wind speed. Some embodiments include a controller 128. In these embodiments, the anemometer 126 transmits wind speed data to the controller. Some wind turbines require being started before they can be efficiently rotated by the wind. The controller 128 can be used to start the wind turbine at low wind speeds, such as 8 to 15 miles per hour. Some wind turbines cannot function safely at high speeds, such as above 45 miles per hour or higher. The controller 128 can also be used to shut off the wind turbine at high speeds. In some embodiments, the controller 128 also turns the blades 106 so that they are pitched into or out of the wind. The blades 106 may be pitched out of the wind when winds are too high or too low to produce electricity. It should be noted that the mechanisms described herein will allow some embodiments of wind turbines 100 to begin functioning at lower speeds and/or higher speeds, thus requiring less controller intervention and/or blade pitching. The wind turbine 100 may also include a brake 130, which can be used to stop the rotor 102 mechanically, electrically, or hydraulically in emergencies.

Wind turbines are generally categorized as vertical axis wind turbines (VAWTs) and horizontal axis wind turbines (HAWTs). VAWTs by their very nature are always aligned with the wind, whereas HAWTs may require adjustments when the wind direction changes. Some HAWTs are down wind turbines, which are blown into proper alignment by the wind itself. Other HAWTs are upwind wind turbines, which require being turned upwind. FIG. 1, includes additional components that are used by some embodiments of upwind HAWTs. The wind vane 132 measures the wind direction. The wind vane 132 communicates wind direction to a yaw drive 134, which is powered by a yaw motor 136. The yaw drive 134 turns the rotor 102 to face the wind. The yaw drive 134 is also used to keep the rotor 102 facing into the wind.

In some embodiments, many of the components listed above are enclosed in a nacelle 138, which is located behind the rotor 102. The 136 nacelle 138 sits on top of a tower 140 near the rotor 102. The tower 140 allows the wind turbine 100 to capture higher speed winds that flow at elevations further from the earth's surface. In some embodiments, the towers are 250 feet or more in height.

Figure 2A:
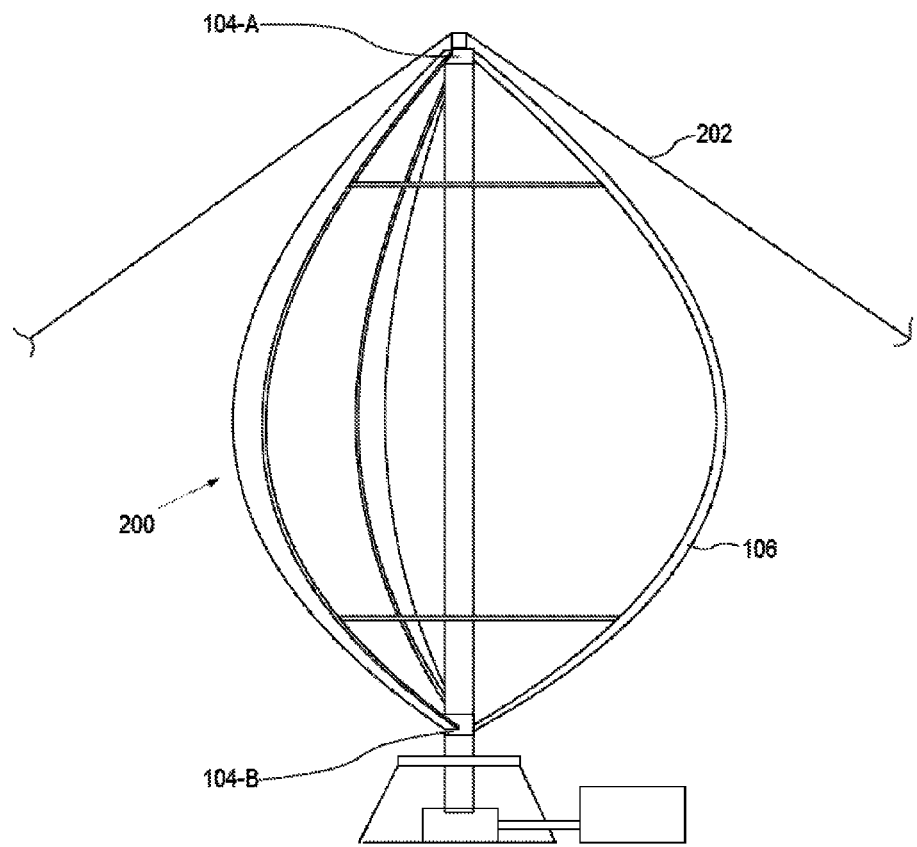
FIG. 2A illustrates a vertical axis wind turbine in accordance with some embodiments of the invention.
Figure 2B:
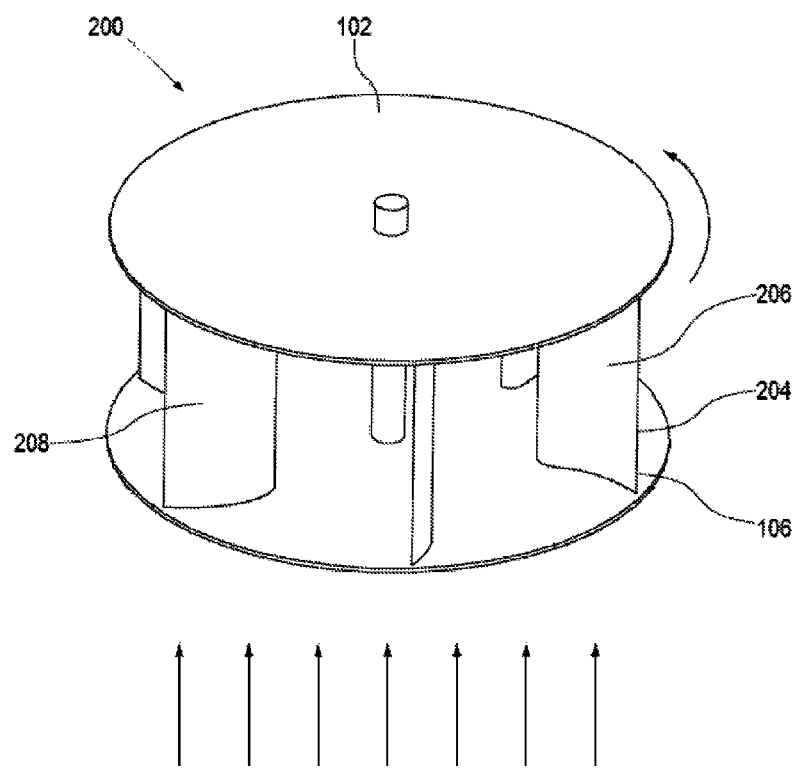
FIG. 2B illustrates capture type blades on a vertical axis wind turbine in accordance with some embodiments of the invention.

FIGS. 2A and 2B show vertical axis wind turbines (VAWTs) according to some embodiments of the invention. VAWTs are mounted vertically, perpendicular to the ground, (whereas HAWTs, like the HAWT shown in FIG. 1, are mounted horizontally, parallel with the ground). As stated above, VAWTs do not need to be aligned with the wind, which make them popular for small scale wind turbine use. For example, some VAWTs are used in rural, off-grid areas to power a single farm or home. As shown in FIG. 2A, the VAWT 200 includes one or more blades 106 attached to two hubs 104, an upper hub 104-A and a lower hub 104-B. The other mechanisms discussed with respect to FIG. 1 are located in the base of a VAWT. FIG. 2A illustrates a gear mechanism 110 and generator 108. In some embodiments, the VAWT 200 is secured using a guy wire 202. The embodiments shown in FIGS. 2A and 2B are not illustrated on towers, but other embodiments are envisioned in which these VAWTs are placed on towers.

Figure 3:
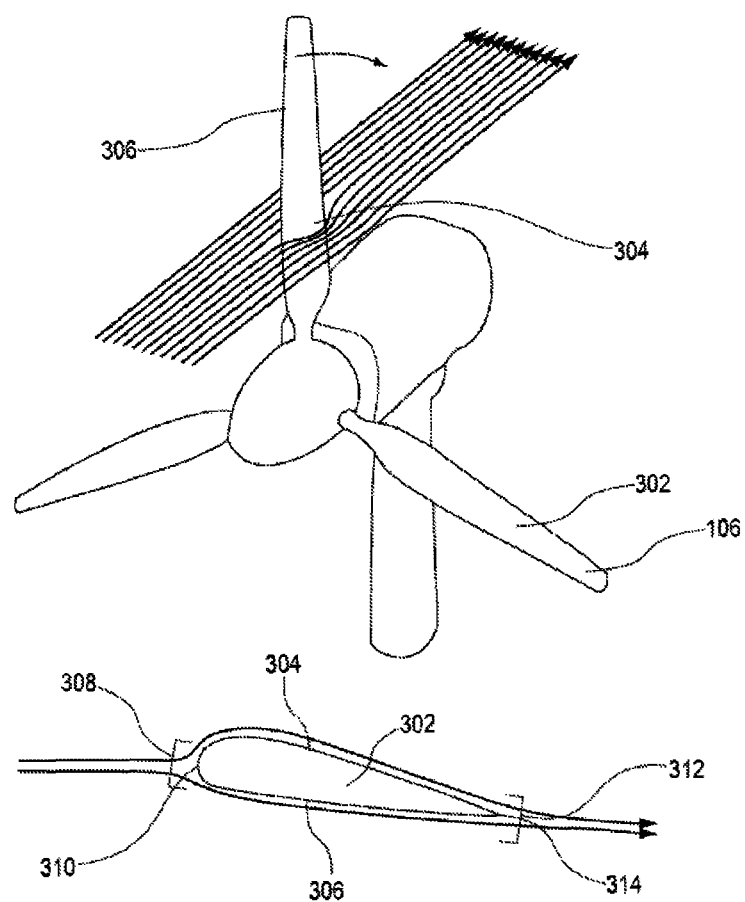
FIG. 3 illustrates foil type blades on a horizontal axis wind turbine in accordance with some embodiments of the invention.

Rotor blades of both VAWTS and HAWTS can include capture type blades (204, FIG. 2B) and foil type blades (306, FIG. 3). In some embodiments, capture type blades (204, FIG. 2B) are used by low speed wind turbines 100, while foil type blades (306, FIG. 3) are used by high speed wind turbines 100. An embodiment of a wind turbine 100 with capture type blades 204 is shown in FIG. 2B. Capture type blades 204 use the wind's force to push the rotor 102 into motion. The capture type blade 204 has a scoop shape. The concave side 206 is also called the capture side of the blade. The capture side 206 captures the wind and is pushed by the wind to rotate the rotor 102. The convex side 208 is also called the drag side 208 of the blade. When drag is reduced on the drag side 208 of a capture type blade 206, the rotor 102 rotates faster and thus increases the amount of electrical power the wind turbine 100 generates.

According to some embodiments of the invention, a film 400 (see FIGS. 4A-4C) is disposed over at least a portion of the drag side 208 of the capture type blade 204 to reduce drag of the capture type blade 206. Capture type blades 204 with the film 400 disposed over portions of the drag side 208 according to various embodiments are shown in FIGS. 6A-6E. Applying the drag reducing film (400, FIG. 4A) to the drag side 208 of a wind turbine 100 will cause the rotor 106 to rotate faster at a given wind speed, thus allowing the wind turbine 100 to run more effectively at that given speed. In some embodiments, when the film 400 is disposed on the drag side 208, the wind turbine reaches its maximum generation capacity at lower wind speeds. In other words, the wind turbine 100 without the film 400 would reach its maximum generation capacity at a speed of N, and the wind turbine 100 with the film 400 reaches its maximum generation capacity at a speed of less than N. Similarly, in some embodiments, the low speed wind turbines with the film 400 applied to the drag side 208 of the capture type blades 204 will begin producing power at lower speeds than was possible before the film 400 was applied.

Figure 2C:
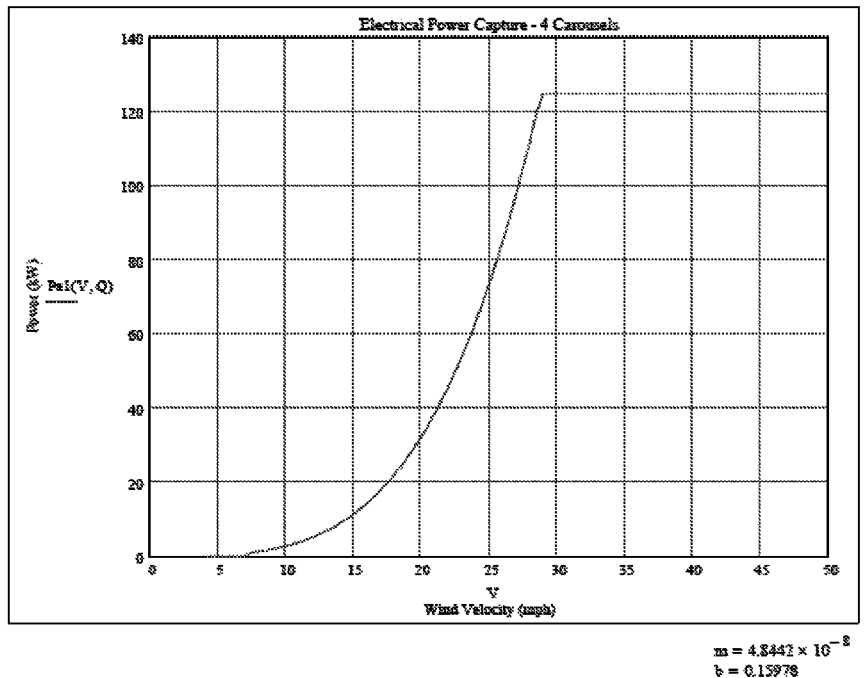
FIG. 2C is a graph showing Power to Wind Velocity of a turbine without film applied.
Figure 2D:
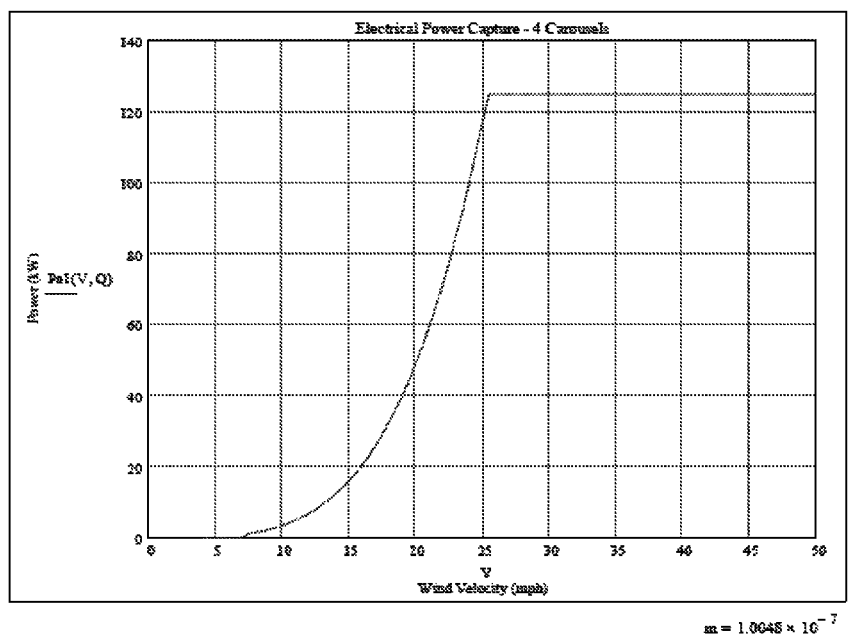
FIG. 2D is a graph showing Power to Wind Velocity of a turbine with film applied.

FIGS. 2C and 2D contain graphs that show some test results for low speed wind turbines 100 employing capture type blades 204 with and without the film 400 applied. The graph in FIG. 2C shows the Power to Wind Velocity of a turbine without film applied. The graph in FIG. 2D shows the Power to Wind Velocity of a turbine with film applied.

As can be seen from the graphs in FIGS. 2C and 2D, when no film 400 is applied, the wind turbine 100 reaches its maximum generation capacity (125 kW) at a wind speed of 29 miles per hour, whereas when the film 400 is applied to the drag side 208 of the capture type blade 204 the wind turbine 100 reaches its maximum generation capacity (124 kW) at a wind speed of 25.5 miles per hour.

Furthermore, at a given wind speed below where either wind turbine 100 has reached the maximum generation capacity, the difference in power generation is markedly improved when the film 400 is applied to the drag side 208 of the capture type blade 204. For example, at a wind speed of 25 miles per hour, the wind turbine 100 with no film 400 applied generates 73.5 kW of electricity, whereas the wind turbine 100 with the film 400 applied to the drag side 208 generates 117.3 kW of electricity. This is a 60% increase in electricity produced for the same wind turbine, at the same wind speed, with the only improvement being the application of the drag reducing film 400 applied to the drag side 208 of a capture type blade 204.

In other embodiments, it is more beneficial to allow the wind turbine 100 to function at higher wind speeds, rather than lower wind speeds. In some embodiments, the film 400 is applied to the capture type blade 204 in different locations to facilitate this. For example, in some embodiments the film 400 is applied over at least some of the capture side 206 portion 308 to decrease the capture side's ability to hold the wind, thus causing the rotor to rotate slower at a given wind speed. This may be beneficial for wind turbines 100 that otherwise encounter a large amount of winds having higher than optimal speeds.

FIG. 3 shows an embodiment of a wind turbine 300 having foil type blades 302. Foil type blades 302 use aerodynamic principles to rotate the rotor 102. A foil type blade 302 includes a curved side 304 and a flat side 306. Wind flows faster over the curved side 304, producing lift (a low pressure area). Wind flows over the flat side 306 at a slower speed than wind flowing over the curved side 304, producing an area of higher pressure near the flat side 306. The higher pressure air pushes the flat side 306 and causes the foil blade 302 to move into the low pressure area near the curved side 304 which rotates the rotor 102.

The foil type blade 302 has a leading edge portion 308 which includes portions of the curved side 304 and the flat side 306 that are adjacent to a leading edge 310 (the upwind edge). The foil type blade 302 also has a trailing edge portion 312 which includes portions of the curved side 304 and flat side 306 that are adjacent to a trailing edge 314 (the downwind edge). At least some of the trailing edge portion 312 produces drag. The trailing edge portion 312 is thus sometimes referred to as the drag portion 312 of the foil type blade 302.

According to some embodiments, a film 400 (see FIG. 4A) is applied to at least some of the trailing edge portion 312 of the foil type blade 302 to reduce drag of the foil type blade 302. In some embodiments, the film 400 allows the foil type blade 302 to rotate faster. In some embodiments, when the film 400 is disposed on the drag portion 312, the wind turbine 100 reaches its maximum generation capacity at lower wind speeds. In other words, the wind turbine 100 without the film 400 would reach its maximum generation capacity at a speed of N, and the wind turbine 100 with the film 400 reaches its maximum generation capacity at a speed of less than N. Thus, applying the drag reducing film (400, FIG. 4A) to the drag portion 312 of a wind turbine 100 will make the wind turbine 100 run more effectively at low wind speeds. Similarly, in some embodiments, the wind turbines 100 with the film 400 applied to the drag portion 312 of the foil type blades 302 will begin producing electricity at lower speeds than was possible before the film 400 was applied.

In other embodiments, it is more beneficial to allow the wind turbine 100 to function at higher wind speeds, rather than lower wind speeds. In some embodiments, the film 400 is applied to the foil type blade 302 in different locations to facilitate this. For example, in some embodiments the film 400 is applied over at least some of the leading edge portion 308 to produce a turbulent boundary layer where a laminar boundary layer would have existed without the film 400, thus causing increased drag.

Additionally or alternatively, in some embodiments the film 400 is disposed over a portion of the foil type blade 302 to increase or decrease the pressure differential between the two sides of the foil type blade 302, thus increasing or decreasing the speed at which the rotor 102 will rotate at a given wind speed. In some embodiments, the film 400 is used to improve lift of the foil type blade 302. With improved lift, at a given wind speed the rotor 102 will rotate at an increased velocity than it would have without the film 400, which increases the electrical power generated by the wind turbine 100 at that wind speed. In some embodiments, the film 400 is applied to at least a portion of the curved side 304 to increase air velocity over the curved side 304. In other embodiments, the film 400 is applied to at least a portion of the flat side 306 to increase air velocity over the flat side 306, which decreases the total pressure differential and allows the rotor 102 to rotate slower at a given wind speed than it would have without the film 400. This is beneficial to wind turbines that encounter a lot of winds that have higher than optimal velocities.

In some embodiments, the film 400 is applied to more than one portion of the foil type blade 302 to change the speed of the rotor 106 at a given wind speed. In some embodiments the film 400 is applied to the foil type blade 302 to both increase lift and decrease drag, both of which increase the rotor's rotation at a given wind speed. For example, in some embodiments the film 400 is placed on at least a portion of the curved side 304 and at least a portion of the drag portion 312 of the foil type blade 302. Conversely, in some embodiments the film 400 is applied to the foil type blade 302 to both decrease lift and increase drag, both of which decreases the rotor's rotation at a given wind speed. For example, in some embodiments the film 400 is placed on at least a portion of the flat side 306 and at least a portion of the leading portion 308 of the foil type blade 302. FIGS. 7A-7G show foil type blades 302 with the film 400 disposed over various portions of the foil type blade 302 according to various embodiments.

Figure 4A:
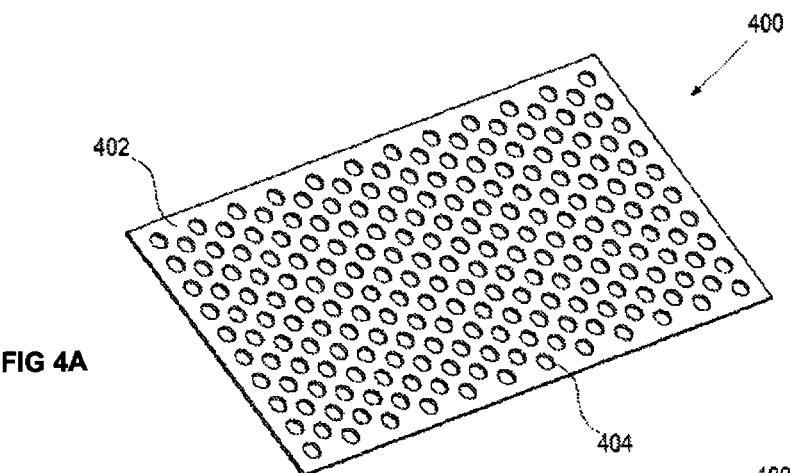
FIGS. 4A-4C are perspective, top, and side views of a turbulence inducing film according to some embodiments of the invention.
Figure 4B:
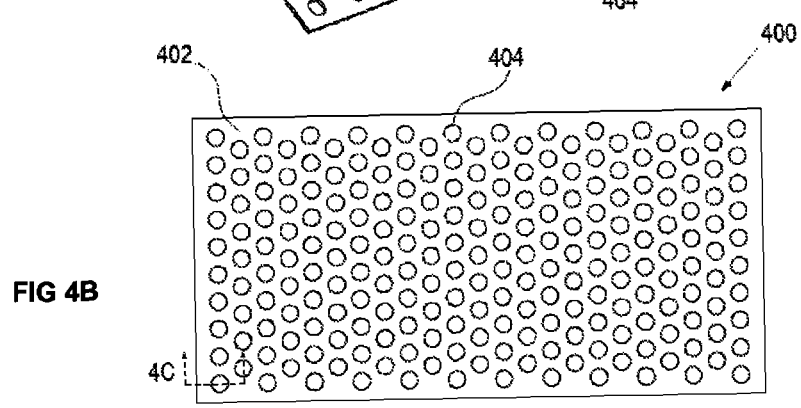
Figure 4C:
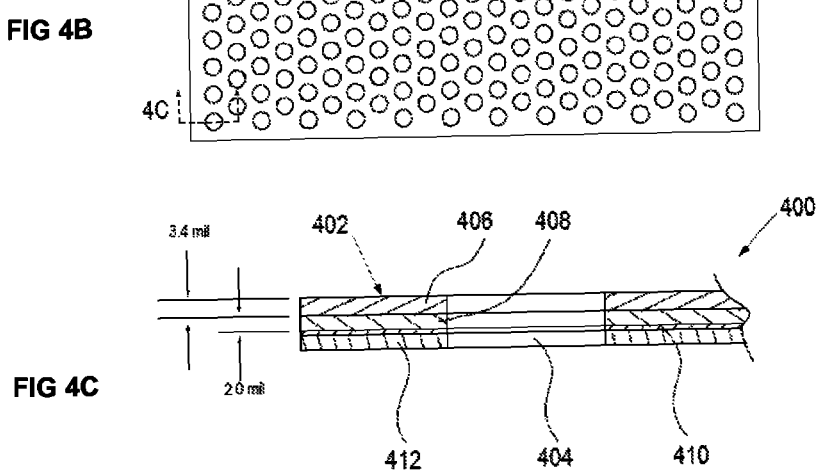

FIGS. 4A-4C show perspective, top, and side views of a turbulence inducing film 400, according to some embodiments. The film 400 comprises a sheet material 402 that has a plurality of perforations 404 therethrough. The perforations 404 are configured to induce turbulence on a fluid flowing over the film 400.

The film 400 induces turbulence on a fluid flowing thereover because of its perforations 404. A basic summary of how the perforations 404 induce turbulence is described below. When the film 400 is applied to an article, the perforations 404 create an uneven surface on the article. The perforations 404 form wells in the surface of the film 400 (the bottom of the well is the article and the sides of the well are the film 400). When a fluid flows over this uneven surface, i.e. when a fluid flows over the film 400, the layer of the fluid flowing nearest to the perforations interacts or mixes. This creates a turbulent state, often referred to as a turbulent boundary layer of the fluid. This mixing also increases the speed of the fluid within the boundary layer. One of the benefits of the turbulent boundary layer is that it decreases drag on a moving article.

The perforations 404 are configured to induce turbulence and reduce drag on the article to which the film 400 is applied. For example, in some embodiments, as discussed above, the film 400 is applied to various portions of capture type blades 204 and foil type blades 302 of wind turbines 100 to reduce drag, which increases the velocity of the rotor, and thus increases power production of the wind turbine at a given wind speed.

In some embodiments, the sheet material 402 is a cast vinyl material. In some embodiments, the cast vinyl material is the type traditionally used to wrap the non-glass portions of motor vehicles. In some embodiments, the film 400 comprises at least one layer of cast vinyl material with air egress technology. In other words, the film 400 may include a plurality of crisscrossed channels on its underside for releasing air from between the blade 106 and the sheet material 402 when the film 400 is being applied to the blade 106. It should be noted, that the perforations 404 will also release air from between the blade 106 and the sheet material 402 when film 400 is being applied to the blade. As such, not all embodiments require air egress technology. In some embodiments, the sheet material 402 comprises a plurality of vehicle wrapping products layered on top of one another, such as several layers of cast vinyl material. For example, in some embodiments the sheet material 402 comprises a top layer 406 and a bottom layer 408. In some embodiments, the top layer 406 is a cast vinyl material without air egress technology, while the bottom later 408 is a cast vinyl material with air egress technology.

The sheet material 402 has a defined thickness. Some embodiments of the film 400 will include a sheet material having a thickness T, while other embodiments will have a thickness of less than T, and other embodiments will have a thickness of greater than T. The thickness of the sheet material 402 may depend on the needs of the wind turbine 100 to which it will be applied. For example, if it is desired that the perforations 404 form depth of 8 mil when applied to a blade 106, then the sheet material 402 will have a thickness of 8 mil. As shown in FIG. 4C, in some embodiments the sheet material 402 includes a bottom layer 408 that is thinner than the top layer 406. FIG. 4C shows an embodiment where the bottom layer 408 is 2.0 mil (51 microns) thick while the top layer 406 is 3.4 mil (96 microns) thick, making the total thickness of the film 400 approximately 5.4 mil (147 mil). As discussed above, in some embodiments the film 400 comprises sheet material 402 made out of only one layer of vinyl material. In some embodiments, the film 400 is as thin as 1.5 mil. Similarly, in some embodiments, the film 400 will be up to 20 mil thick. Thicker films 400 can be produced by layering numerous layers wrapping products on top of one another, such as three or more layers of cast vinyl material. Alternatively, thick films 400 are made from a sheet material 402 comprising only one layer of wrapping product having the desired thickness.

In most embodiments, the sheet material 402 will include an adhesive 410 on one side of the material. In some embodiments, the adhesive 410 is a long term removable acrylic material. In other embodiments, the adhesive 410 is a permanent adhesive. In some embodiments, before the film 400 is applied to a blade 106, it is attached to a liner 412, which keeps the adhesive 410 from sticking. The liner 412 is removed before the film 400 is applied to a portion of a blade 106. In some embodiments, the sheet material 402 includes rivets or corrugations. However, in most embodiments the sheet material 402 is flat. Thus, in most embodiments the only significant change in elevation of the film 400 comes from the perforations 404 therethrough. As shown in the various views of the film 400 in FIGS. 4A-4C, the perforation 404 of the film 400 form a regular and repeatable pattern. In some embodiments, rather than forming a regular and repeatable pattern, the perforations 404 may be arranged in an irregular pattern. For example, the perforations 404 may be arranged in accordance with the specific shape of the blade to which they are applied. By way of further example, in some embodiments, when the film 400 is applied over an edge, a line of perforations 404 is disposed along that edge and the perforations 404 on the sides are disposed at increasingly spaced apart distances from one another as they extend away from the edge. In some embodiments, the perforations 404 are spaced so as to optimize the induction of turbulence on a fluid flowing thereover. Thus, in some embodiments, the specific arrangement of the perforations 404 will be dependent upon the design of the particular turbine blade 106 upon which the film 400 is disposed.

Figure 5A:
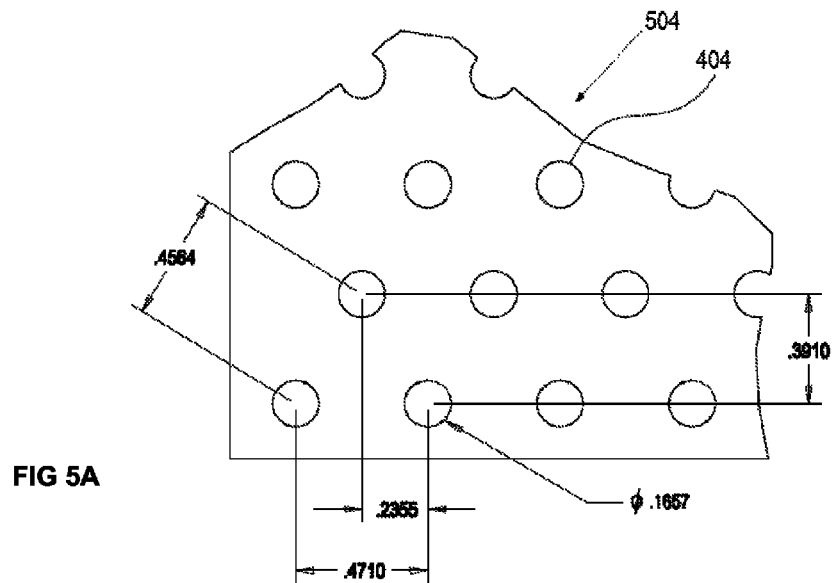
FIGS. 5A and 5B are top views of two embodiments of the turbulence inducing film of FIGS. 4A-4C.
Figure 5B:
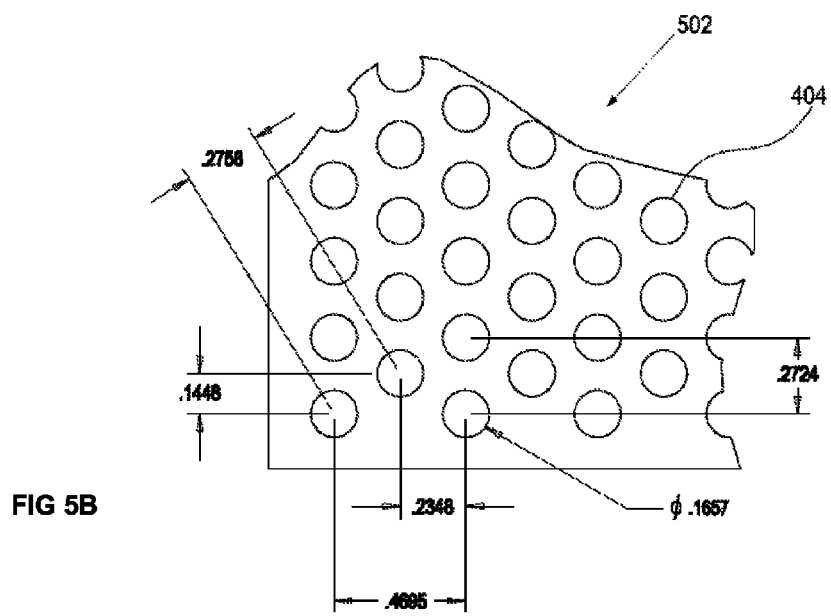

FIGS. 5A and 5B show top views of two embodiments of the turbulence inducing film 400. In both embodiments the perforation 404 are shown in a regular and repeatable pattern. In each embodiment the perforations 404 have a diameter of approximately 0.1657 inches. In some embodiments of the invention, the perforations 404 are at least 0.14 inches in diameter. In other embodiments of the invention, the perforations 404 are no more than 0.25 inches in diameter. Other embodiments will include other diameters and other shapes of perforations (such as squares, hexagons, octagons, ovals, etc.), without departing from the principles of this disclosure.

In other embodiments, the perforation 404 are larger or smaller than those mentioned above, such that they induce turbulence on a fluid flowing over them in a manner beneficial to and consistent with the product to which they are applied. For example, in some embodiments when the film 400 is applied to a capture type blade 204 of a wind turbine 100, the perforations 404 will be appropriately sized to induce turbulence on the drag side 208 of the capture type blade 204. Similarly, when the film 400 is applied to a foil type blade 302 of a wind turbine 100, the perforations 404 will be appropriately sized to induce turbulence on the drag portion (trailing edge portion 312) of the foil type blade 302. Likewise, in some embodiments, the diameter of the perforations is dependent upon the dimensions of the blade to which it will be applied. For example, a film 400 with larger diameter perforations 404 is used for larger turbine blades, and a film 400 with smaller diameter perforations 404 is used for smaller turbine blades.

FIG. 5A shows an embodiment of the film 400 with perforations 404 having sparse spacing 502, wherein the perforations 404 are spaced relatively far from one another. In some embodiments of sparse spacing 502, the perforations 404 are offset from one another line-to-line as shown in this figure. The perforations 404 are spaced approximately 0.4710 inches horizontally, 0.3910 inches vertically, and 0.4564 inches diagonally from one another (measured center to center). In other embodiments of sparse perforation spacing 502, the spacing between the perforations 404 will vary from this arrangement. For example, in some embodiments, the perforations are not offset from one another. As shown in FIG. 5A, in some embodiments of the film 400, the perforations 404 are spaced less then 0.5 inches center to center from a nearest adjacent perforation 404.

FIG. 5B shows an embodiment of the film 400 with perforations 404 having dense spacing 504, wherein the perforations 404 are spaced closer to one another than in the embodiment of FIG. 5A. In some embodiments of dense spacing 504, the perforations 404 are offset from one another line-to-line as shown in this figure. The perforations 404 are spaced approximately 0.4695 inches horizontally and 0.2724 inches vertically (center to center) from the perforations 404 directly above and beside them as shown. The perforations 404 are spaced 0.2348 inches horizontally, 0.1448 inches vertically, and 0.2758 inches diagonally (center to center) from their nearest offset neighbor, as shown. In other embodiments of dense perforation spacing 504, the spacing between the perforations will vary from this arrangement. As shown in FIG. 5B, in some embodiments of the film 400, the perforations 404 are spaced at least 0.1 inches center to center from a nearest adjacent perforation 404.

Other embodiments will include other offsets and spacing outside of the scope of the sparse perforation spacing 502 and dense perforation spacing 504 described above. For example, any spacing between 0.1 inches and 0.5 inches center to center from a nearest adjacent perforation fall within the scope of this invention. However, at least for certain embodiments, perforations 404 spacings outside of this range are also envisioned. In some embodiments, when the film 400 has dense perforation spacing 504, the sheet material 402 has a thickness of at least 0.5 mil. In some embodiments, when the film 400 has sparse perforation space 502, the sheet material 401 has a thickness of 0.3 mil or less.

FIGS. 6A-6E show capture type blades 204 with the turbulence inducing film 400 disposed over various portions of the blades 204 in accordance with various embodiments. In each of these embodiments the film 400 is disposed only over the drag side 208 of the blade. FIG. 6A shows an embodiment wherein the film 400 is disposed over substantially all of the drag side 208 of the capture type blade 204. In some embodiments the film is applied to less than all of the drag side 208, and may be placed on portions of the drag side 208 of the blade having drag coefficients of a level that are determined to be too high. For example, in some embodiments the film 400 will be placed only on portions of the drag side 208 of the capture type blade 204 having greater than average drag coefficients.

FIG. 6B shows embodiments wherein the film 400 is disposed over 75% of the drag side 208 of the capture type blade 204. FIG. 6C shows embodiments wherein the film 400 is disposed over 50% of the drag side 208 of the capture type blade 204. FIG. 6D shows embodiments wherein the film 400 is disposed over 25% of the drag side 208 of the capture type blade 204. FIG. 6E shows embodiments wherein the film 400 is disposed over less than 25% of the drag side 208 of the capture type blade 204.

Although not shown in FIG. 6, in some embodiments the film 400 is placed on all or at least portions of the capture side 206 of the capture type blade 204. This may be done in connection with, or apart from film 400 on the drag side 208 of the capture type blade 204. Placing the film 400 on the capture side 206, instead of the drag side 208, may be used to affect rotor speed. For example, placing the film 400 only on the capture side 206 of the blade 204 may serve to slow down the rotor speed of the wind turbine 100, which may be beneficial for wind turbines that encounter a substantial amount of higher than optimal wind speeds.

FIGS. 7A-7G shows foil type blades 302 with the turbulence inducing film 400 disposed over various portions of the foil type blades 302 in accordance with various embodiments. It should be noted that a center line is shown in these figures in order to indicate where the various embodiments only cover areas of the foil type blade 302 on the trailing edge 314 side of the center line. FIG. 7A shows an embodiment wherein the film 400 is disposed over substantially all of the trailing portion 312 of the foil type blade 302. In some embodiments the film is applied to less than all of the trailing portion 312, and may be placed on portions of the trailing portion 312 of the foil type blade 302 having drag coefficients of a level that are determined to be too high. For example, in some embodiments the film 400 will be placed only on portions of the trailing portion 312 of the foil type blade 302 having greater than average drag coefficients.

FIG. 7B shows embodiments wherein the film 400 is disposed over 75% of the trailing portion 312 of the foil type blade 302, either evenly distributed on either side of the trailing edge 314 or unevenly distributed. FIG. 7C shows embodiments wherein the film 400 is disposed over 50% of the trailing portion 312 of the foil type blade 302, either evenly distributed on either side of the trailing edge 314 or unevenly distributed. FIG. 7D shows embodiments wherein the film 400 is disposed over 25% of the trailing portion 312 of the foil type blade 302, either evenly distributed on either side of the trailing edge 314 or unevenly distributed. FIG. 7E shows embodiments wherein the film 400 is disposed over less than 25% of the trailing portion 312 of the foil type blade 302, either evenly distributed on either side of the trailing edge 314 or unevenly distributed. FIG. 7F shows embodiments wherein the film 400 is disposed only on one side, e.g., the flat side 306, of the foil type blade 302. As illustrated, the film 400 may be disposed entirely over the flat side 306 or some portion thereof. FIG. 7G shows embodiments wherein the film 400 is disposed only on an alternated side of the foil type blade 302, e.g., the curved side 304. As illustrated, the file 400 may be disposed entirely over the curved side 304 or some portion thereof. The benefits of applying the film 400 to various parts of the foil type blade 302 were discussed with respect to FIG. 3. Although not shown in FIG. 7, in some embodiments the film 400 is placed on all or at least portions of the leading edge portion 308 of the foil type blade 302.

Figure 8A:
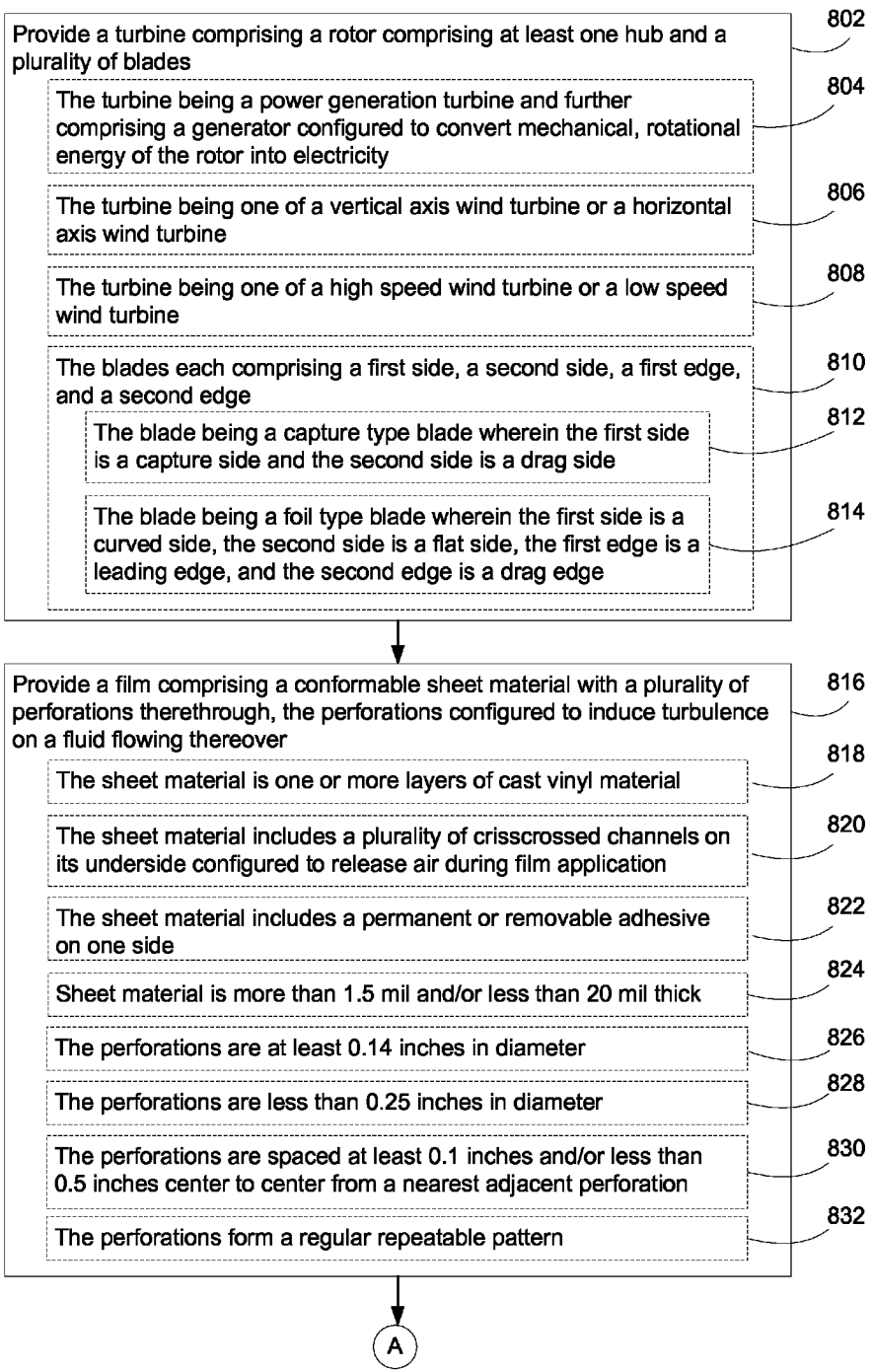
FIGS. 8A-8C are a multi-page flowchart representing methods of applying and using a turbulence inducing film on a wind turbine in accordance with some embodiments of the invention.
Figure 8B:
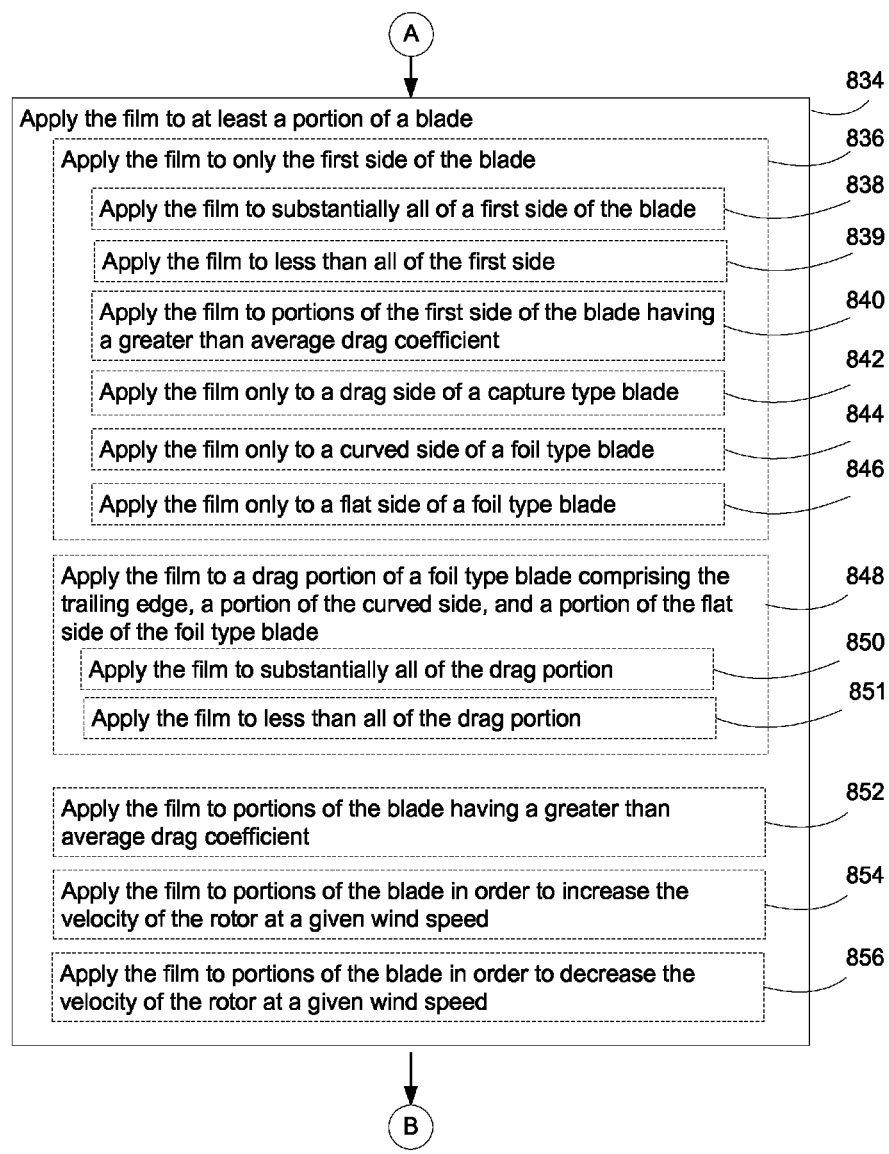
Figure 8C:
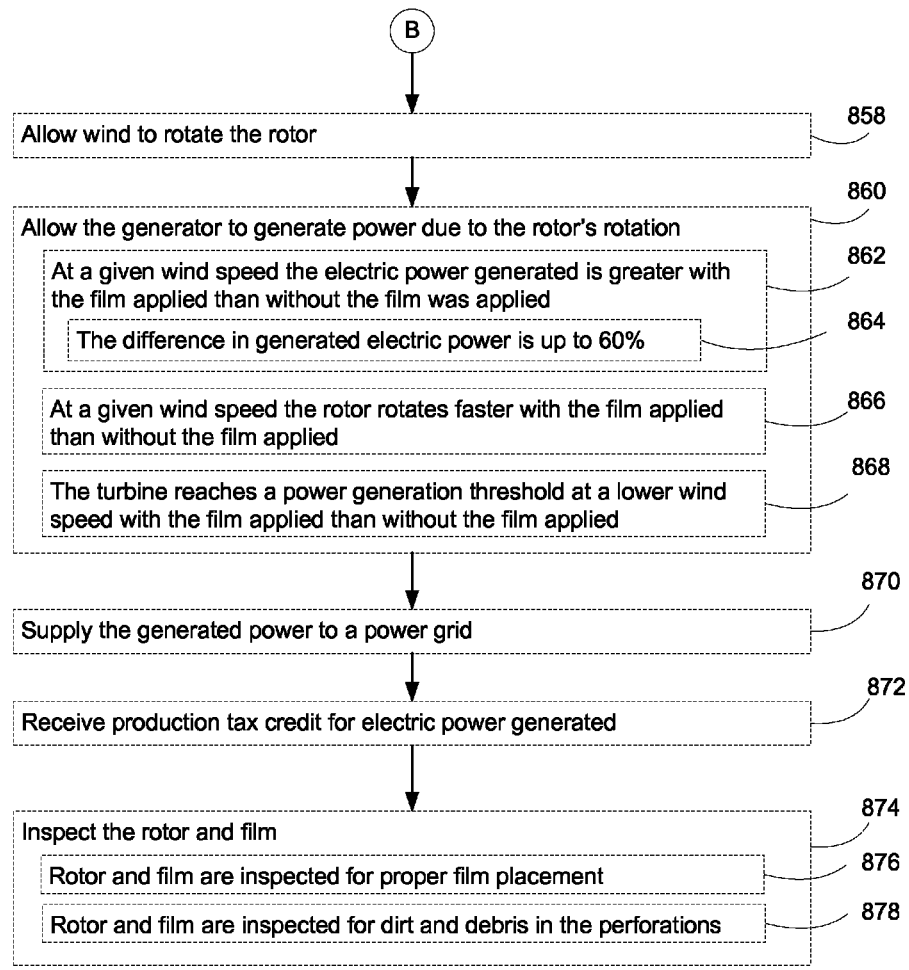

FIGS. 8A-8C are a multi-page flowchart representing various methods according to some embodiments of the invention. Some portions of this flowchart encompass the method of applying the turbulence inducing film to a rotor blade. Other portions of this flowchart encompass generating electric power using a wind turbine whose rotor blades have the turbulence inducing film disposed thereon.

In some embodiments, the method begins as shown in FIG. 8A. A turbine comprising a rotor comprising at least one hub and a plurality of blades is provided (802). In some embodiments the turbine is a power generation turbine that further comprises a generator configured to convert mechanical, rotational energy of the rotor into electricity (804). In some embodiments the electricity is in the form of AC power. In some embodiments, the turbine is a vertical axis wind turbine (VAWT), while in other embodiments the turbine is a horizontal axis wind turbine (HAWT) (806). Similarly, in some embodiments, the turbine is a high speed wind turbine, configured to produce electricity effectively at high wind speeds, while in other embodiments the turbine is a low speed wind turbine configured to produce electricity effectively at low wind speeds (808). According to some embodiments of the invention, low speed wind turbines will operate at speeds as low as 2 miles per hour. According to some embodiments of the invention, high speed wind turbines will operate at speeds as high as 55 miles per hour. Some embodiments will perform at even higher wind speeds.

The blades of each rotor comprise a first side, a second side, a first edge, and a second edge (810). There are numerous ways in which the rotor blades can be configured, which are known in the art. In some embodiments, each blade is a capture type blade, and the first side is the capture side while the second side is the drag side (812). In other embodiments, each blade is a foil type blade, wherein the first side is a curved side, the second side is a flat side, the first edge is a leading edge, and the second edge is a drag edge (814).

According to some embodiments, the method further includes providing a film comprising a conformable sheet material with a plurality of perforations therethrough (816). The perforations are configured to induce turbulence on a fluid flowing thereover. In some embodiments, the induction of turbulence by the perforations causes a reduction in drag when a fluid passes over an article to which the film has been applied. In some embodiments, the sheet material of the film is a cast vinyl material (818). In some embodiments, the sheet material includes air egress technology. For example, in some embodiments the sheet material includes a plurality of crisscrossed channels on the underside (i.e., the side of the sheet material that contacts the article to which it is applied) the channels are configured to release air during film application (820). In some embodiments the underside of the sheet material includes an adhesive (822). In some embodiments, the adhesive is permanent, while in other embodiments, the adhesive is removable. The thickness of the sheet material may be different in different embodiments. In some embodiments the sheet material is more than 1.5 mil and/or less than 20 mil thick (824).

In some embodiments the perforations are circular, while in other embodiments the perforations are non-circular. The perforations are at least 0.14 inches in diameter, according to some embodiments (826). The perforations are less than 0.25 inches in diameter, according to some embodiments (828). Thus, according to some embodiments, the diameter of the perforations is between 0.14 and 0.25 inches in diameter. According to some embodiments the perforations are spaced at least 0.1 inches apart and/or less than 0.5 inches center to center from a nearest adjacent perforation (830). In some embodiments, the perforations are disposed on the sheet material in a regular and repeatable pattern (832). In other embodiments the pattern of the perforations varies with and is dependent upon the shape and configuration of the rotor blade to which it will be applied.

According to some embodiments, the method continues as shown in FIG. 8B. The film is applied to a portion of a blade (834). In some embodiments the film is applied to each blade of the turbine, while in other embodiments the film is applied less than all of the turbine blades. For example, in some embodiments, the film is applied to half of the turbine blades in an alternating fashion. In some embodiments, the film is applied to only the first side of the blade (836). In some embodiments, the film is applied to substantially all of the first side of the blade (838). In other embodiments, the film is applied to only a sub portion of the first side of the blade such as 75%, 50%, 25%, or less as shown in certain embodiments of FIGS. 6 and 7 (839). In some embodiments, the film is applied to portions of the first side of the blade having greater than average drag coefficients (840). In some embodiments, the film is applied only to a drag side of a capture type blade (842). In other embodiments, the film is applied only to a curved side of a foil type blade (844). While in other embodiments, the film is applied only to a flat side of a foil type blade (846).

In some embodiments, the film is applied to a drag portion of a foil type blade comprising a trailing edge, a portion of a curved side, and a portion of a flat side of the foil type blade (848). In some embodiments, the film is applied to substantially all of the drag portion of the foil type blade (850). In other embodiments, the film is applied to only a sub portion of the drag portion such as 75%, 50%, 25%, or less as shown in various embodiments illustrated in FIG. 7 (851).

In some embodiments, the film is placed on the portions of the blade having greater than average drag coefficients (852). This may include adjacent or non-adjacent portions of the blade. Similarly, in some embodiments the film is applied to portions of the blade in order to increase the velocity of the rotor at a given wind speed (854). In some embodiments, the film is applied in such a way that it reduces the blade's drag and/or increases the blade's lift. In other embodiments, such as those where winds have greater than optimal average velocities, the film is applied to portions of the blade in order to decrease the velocity of the rotor at a given wind speed (856). For example, in some embodiments the film is applied in such a way that it increased the blade's drag, or ability to hold air, and/or the film is placed in such a way that it decreases the blade's lift.

According to some embodiments, the method continues as shown in FIG. 8C using the rotor with the film applied. According to some embodiments, the method further includes allowing wind to rotate the rotor (858). In some embodiments, this involves pre-starting the rotor's motion using a controller and thereafter allowing the wind to rotate the rotor. In other embodiments, the wind itself takes the rotor from a standstill to a state of rotation without external interventions. Then, in some embodiments, the method further includes allowing the generator to generate power due to the rotor's motion (860). In some embodiments the rotation of the rotor is stepped up using a gear mechanism, while in other embodiments the rotor rotates the magnet(s) in the generator directly.

In some embodiments, the film is applied to particular portions of the blade such that at a given wind speed the electric power generated (i.e., the electricity produced) with the film applied is greater than the power generated without the film applied (862). For example, in some embodiments the percentage increase at a given wind speed is up to 60% more power generated with the film applied than without the film applied (864). Furthermore, in some embodiments the film is applied to the blades such that, at a given wind speed the rotor rotates faster after the film is applied than it does without the film applied (866). Conversely, in some embodiments the film has been applied to the blades such that, at a given wind speed the rotor rotates slower with the film applied than without the film applied. Furthermore, in some embodiments the film has been applied to the blades such that the wind turbine reaches a power generation threshold at a lower wind speed with the film applied than without the film applied (868).

Then, according to some embodiments, the generated power is supplied to a power grid (870). In some embodiments the power grid, is a local power distribution system associated with one building, farm, or small grouping of buildings or machines. In other embodiments, the power grid is an extensive power distribution system supplying numerous buildings, towns, states, etc.

According to some embodiments, a Production Tax Credit is received for at least some of the electric power generated (872). It should be noted that various government agencies provide a Production Tax Credit for supplying electrical energy that has been produced by wind power. For example, currently the Production Tax Credit for the United States is 1.9 cents per kWh produced. Thus, the Production Tax Credit is received from a third party, often a government agency.

Finally, according to some embodiments the rotor and film are inspected (874). For example, the rotor will be inspected for wear and tear. The film will be inspected to ensure that it was placed properly on the rotor (876). Furthermore, in some embodiments the wells formed by the perforations will be inspected to see if they have collected dirt and debris (878). In some instances, if the dirt and debris collected in the perforations is deemed excessive, the dirt and debris will be removed during the inspection process.

Figure 9:
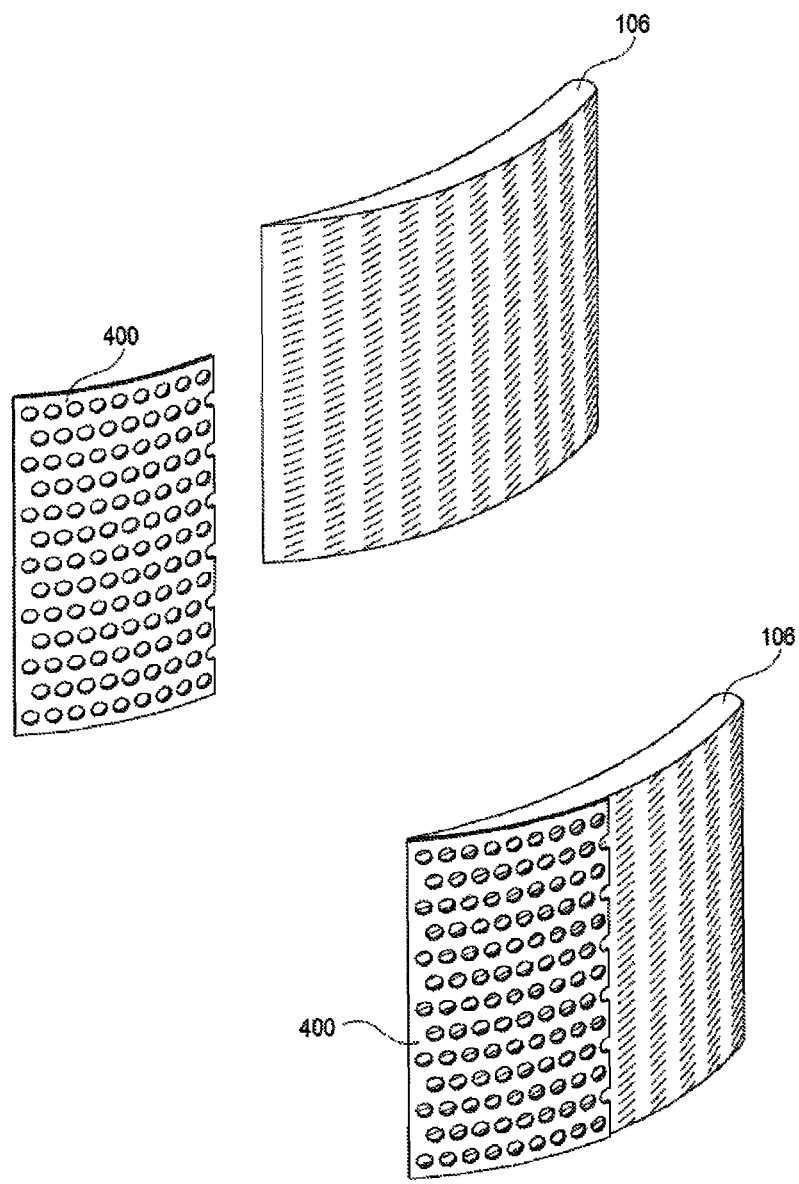
FIG. 9 illustrates an embodiment where the film and the blade to which it is applied are colored differently from one another.

FIG. 9 illustrates an embodiment where the film and the blade to which it is applied are colored differently from one another. In some embodiments the film 400 is opaque and is colored to match the color of the blades 106 to which it is applied. In other embodiments, as shown in FIG. 9, the film 400 is a distinct color from the blade 106 color. When the film 400 and the blades 106 are different colors, the location of the film 400 on the blades 106 is easier to distinguish. This is desirable in some embodiments for visually inspecting whether the film 400 has been applied to the desired areas of the blade 106. Furthermore, when the film 400 and the blades 106 are colored differently from one another, the color of the blades 106 is visible through the perforations 402. In some embodiments, an inspector will visually inspect the blades, to determine whether the perforations 402 have become filled with dust or other debris by inspecting whether the color of the blade 106 is visible through the perforations 402.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. Although the embodiments described herein have focused on applying the turbulence inducing film to rotor blades of wind turbines, other rotor blades are also envisioned. For example, rotor blades used in connection with water or other fluids may also benefit from the turbulence inducing film. Also, rotors are used to push air as well as to capture wind power. For example, rotor blades are used in fans and are used to propel various types of vehicles. The film described herein can be applied to any sort of rotor blade in order to allow the rotor to benefit from the turbulence inducing properties of the perforations. Thus, the rotors and blades discussed above should be understood to encompass any type of rotor or blade, not just the rotors and blades of wind turbines.

What is claimed is:

1. A vertical axis wind turbine comprising:
a rotor comprising a hub and a plurality of blades, wherein each blade of the plurality of blades comprises:
a capture side of the blade;
a drag side of the blade opposing the capture side of the blade; and
a film disposed only over the drag side of the blade, wherein the film comprises a conformable sheet material with a plurality of perforations therethrough, the perforations configured to induce turbulence on a fluid flowing thereover; and
wherein each blade of the plurality of blades is positioned on the rotor so as to produce rotation of the rotor when the capture side of the blade is substantially perpendicular to a direction of an airflow applied to the vertical axis wind turbine.

2. The wind turbine of claim 1, further comprising a generator configured to receive rotational energy from the rotor and convert it into electric power by means of electromagnetic induction; and
wherein the film is disposed over one or more sub-portions of the drag side in order to increase the electric power produced by the generator at a given wind speed than when the wind turbine does not include film on the blades.

3. The wind turbine of claim 2, wherein the film is disposed over portions of the drag side in order to reach a power generation threshold at a lower wind speed than when the wind turbine does not include the film on the blades.

4. The wind turbine of claim 1, wherein the film is disposed over portions of the drag side in order to increase the rotor's velocity at a given wind speed.

5. The wind turbine of claim 1, wherein the film is a first color and the blade is a second color distinct from the first color.

6. The wind turbine of claim 1, wherein the perforations are round.

7. The wind turbine of claim 1, wherein the film is affixed to the blade using an adhesive.

8. A method of inducing turbulence in a boundary layer associated with a fluid flowing over a turbine blade of a vertical axis wind turbine, the method comprising the steps of:
providing a turbine blade configured to be positioned on a rotor of the vertical axis wind turbine so as to produce rotation of the rotor when the capture side of the blade is substantially perpendicular to a direction of an airflow applied to the vertical axis wind turbine, the turbine blade comprising:
a capture side of the blade; and
a drag side of the blade opposing the capture side of the blade;
providing a film comprising a conformable sheet material with a plurality of perforations therethrough, the perforations configured to induce turbulence on a fluid flowing thereover; and
applying the film only to the drag side of the blade.

9. The method of claim 8, further comprising:
inspecting the film and blade to determine whether the film is placed in a desired location, wherein the film is a first color and the blade is a second color distinct from the first color.

10. The method of claim 8, wherein the turbine blade is attached to a rotor, the method further comprising:
allowing wind to rotate the rotor;
allowing a generator to generate electric power due to the rotor's rotation; and
supplying the generated electric power to a power grid.

11. The method of claim 10, further comprising receiving a production tax credit from a third party for at least some of the electric power generated.

12. The method of claim 8, further comprising applying the film over one or more sub-portions of the drag side of the blade.

13. The method of claim 8, wherein the perforations are round.

14. The method of claim 8, wherein the film includes an adhesive on a first side of the film, the method further comprising affixing the film to the blade using the adhesive.

* * * * *